United States Patent
Couturier

(10) Patent No.: US 12,480,478 B2
(45) Date of Patent: Nov. 25, 2025

(54) USE OF A TUNED MASS DAMPER IN A NACELLE FOR A WIND TURBINE

(71) Applicant: Siemens Gamesa Renewable Energy A/S, Brande (DK)

(72) Inventor: Philippe Couturier, Lafayette, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/026,141

(22) PCT Filed: Sep. 23, 2021

(86) PCT No.: PCT/EP2021/076146
§ 371 (c)(1),
(2) Date: Mar. 14, 2023

(87) PCT Pub. No.: WO2022/063872
PCT Pub. Date: Mar. 13, 2022

(65) Prior Publication Data
US 2023/0358214 A1  Nov. 9, 2023

(30) Foreign Application Priority Data

Sep. 25, 2020  (EP) .................................... 20198407

(51) Int. Cl.
*F03D 80/80* (2016.01)
(52) U.S. Cl.
CPC ...... *F03D 80/881* (2023.08); *F05B 2260/964* (2013.01)

(58) Field of Classification Search
CPC .................... F03D 80/881; F05B 2260/964
See application file for complete search history.

(56) References Cited

U.S. PATENT DOCUMENTS

| 6,672,837 B1* | 1/2004 | Veldkamp | ................ F16F 7/10 416/500 |
| 10,018,186 B2* | 7/2018 | Bergua | ...................... F03D 1/00 |
| 11,353,006 B2* | 6/2022 | Munk-Hansen | ...... F03D 7/0296 |
| 2008/0145222 A1 | 6/2008 | Schellings | |
| 2009/0148289 A1* | 6/2009 | Edenfeld | ................ F03D 80/00 416/145 |
| 2012/0076652 A1* | 3/2012 | Ventzke | ................. F03D 15/00 416/61 |

(Continued)

FOREIGN PATENT DOCUMENTS

| CN | 101493704 A | 7/2009 |
| CN | 202 914 618 U | 5/2013 |

(Continued)

OTHER PUBLICATIONS

International Search Report & Written Opinion for PCT/EP2021/076146 issued on Dec. 8, 2021.

*Primary Examiner* — Eldon T Brockman
(74) *Attorney, Agent, or Firm* — Schmeiser, Olsen & Watts LLP

(57) ABSTRACT

A nacelle for a wind turbine is provided, whereby the nacelle includes a nacelle support structure inside of the nacelle, to which at least one tuned mass damper is attached, whereby the at least one tuned mass damper is tuned to target at least one mode of motion of the nacelle in a frequency range below 50 Hz.

14 Claims, 1 Drawing Sheet

(56) References Cited

U.S. PATENT DOCUMENTS

| | | |
|---|---|---|
| 2013/0280064 A1 | 10/2013 | Van Steinvoren |
| 2014/0301846 A1 | 10/2014 | Zhu et al. |
| 2015/0204313 A1* | 7/2015 | Bergua .................... F03D 13/20 |
| | | 702/33 |
| 2016/0123303 A1 | 5/2016 | Ollgaard et al. |

FOREIGN PATENT DOCUMENTS

| | | | | |
|---|---|---|---|---|
| EP | 2 067 991 A2 | 6/2009 | | |
| EP | 2 899 394 A1 | 7/2015 | | |
| EP | 4390115 A1 * | 6/2024 | ........... | F03D 13/256 |
| JP | 2003176774 A * | 6/2003 | ............. | F03D 13/20 |
| KR | 20120003514 U * | 5/2012 | | |
| KR | 101531267 B1 * | 6/2015 | | |

* cited by examiner

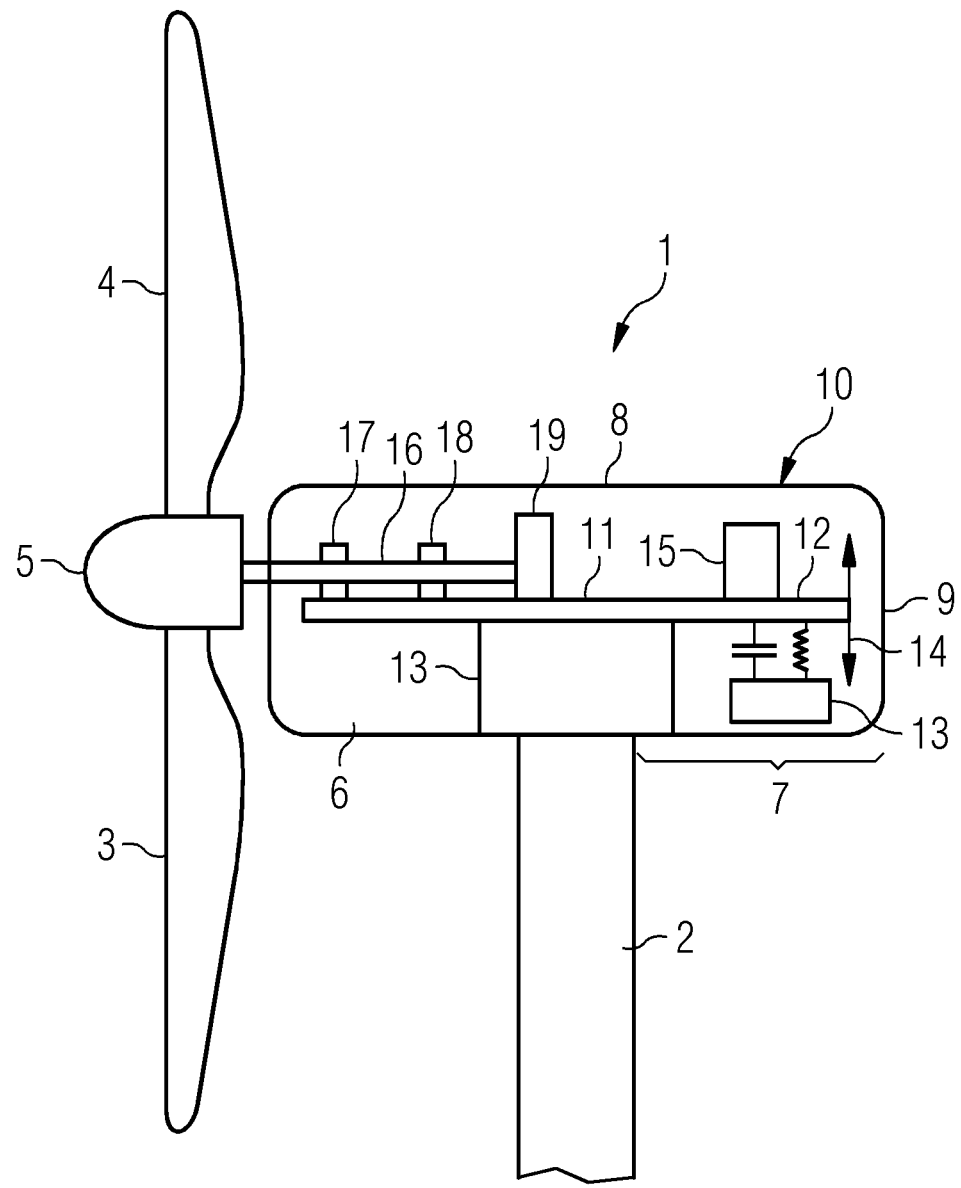

USE OF A TUNED MASS DAMPER IN A NACELLE FOR A WIND TURBINE

CROSS-REFERENCE TO RELATED APPLICATIONS

This application claims priority to PCT Application No. PCT/EP2021/076146, having a filing date of Sep. 23, 2021, which claims priority to European Application No. 20198407.7, having a filing date of Sep. 25, 2020, the entire contents both of which are hereby incorporated by reference.

FIELD OF TECHNOLOGY

The following relates to a nacelle for a wind turbine, a wind turbine and a use of a tuned mass damper in a nacelle of a wind turbine.

BACKGROUND

Embodiments of the invention seek to address is life-shortening nacelle support structure cyclic vibrations which occurs from external load, e.g., aerodynamic loads, installation loads, transportation loads and seismic loads, when excited near resonance. These vibrations have a negative impact on the life of nacelle components supported on the nacelle support structure and the nacelle support structure itself as they can lead to an increase in extreme and fatigue loads. This effect is amplified as nacelle sizes continue to increase since this introduces more compliant support structures with lower fundamental frequencies in the range where external loads have higher energy content.

Internal nacelle cyclic vibrations are currently handled by adding material to avoid resonance frequencies and to account for a reduction in the fatigue strength over the lifetime of the components. This addition of material stiffens the nacelle support structure at the cost of increased price and weight of the nacelle.

SUMMARY

An aspect relates to a technically improved nacelle, the structure of which may experience an increased lifetime without the disadvantages associated with adding material to the structure.

The aspect is solved by a nacelle for a wind turbine, a wind turbine, a use of a tuned mass damper in a nacelle of a wind turbine and a method. Further details of embodiments of the invention unfold from the other claims as well as the description and the drawings. Thereby, the features and details described in connection with the nacelle of embodiments of the invention apply in connection with the wind turbine of embodiments of the invention, the use of the tuned mass damper according to embodiments of the invention and the method according to embodiments of the invention, so that regarding the disclosure of the individual aspects of embodiments of the invention it is or can be referred to one another.

According to a first aspect of embodiments of the invention, the object is solved by a nacelle for a wind turbine, whereby the nacelle comprises a nacelle support structure inside of the nacelle, to which at least one tuned mass damper is attached, whereby the at least one tuned mass damper is tuned to target at least one mode of motion of the nacelle in a frequency range below 50 Hz.

Accordingly, embodiments of the invention provide for at least one tuned mass damper tuned to target at least one or more of the modes of motions that are life-shortening to the nacelle support structure inside of the nacelle as mentioned in the introductory part of this specification. Thereby, addition of further material and weight to the nacelle support structure may be avoided.

Although generally, the use of tuned mass dampers in wind turbines is known from the state of the conventional art, e.g., such as in EP 2 899 394 A1, such tuned mass dampers have, as in the case of the afore-mentioned patent application publication, not been considered for targeting motions of the nacelle or, in other words, modes being specific for the nacelle. Instead, the known tuned mass dampers target the tower modes, such as tower bending modes.

However, as the nacelles and their support structure increase in size, the cyclic vibrations become more relevant with respect to their life-shortening effect on the nacelle support structure and nacelle components. The inventor has found that the use of the at least one tuned mass damper as described herein may significantly reduce the life-shortening effect to a minimum while keeping the costs for this measure relatively low compared to the known solution of adding further material to the nacelle support structure.

In particular, the frequency range below 50 Hz has been identified as the one that, when the at least one tuned mass damper is tuned towards it, the adverse effects described above may be reduced very effectively or even cancelled at. The frequency range below 50 Hz relates to very large displacements of the structure of the nacelle causing the fatigue of the nacelle structure. Tuning the at least one tuned mass damper or several tuned mass dampers attached to the nacelle support structure to this frequency range has shown to effectively damp the motions associated with the increased fatigue of the nacelle structures and increase the lifetime of the structure of the nacelle. The frequency range may be in particular below 40 Hz, more particularly below 30 Hz, further particular below 20 Hz, and even further particular below 10 Hz, which may be characterized as the upper limit of the frequency range. The frequency range may have a lower limit of at least 1 Hz, in particular at least 2 Hz and more particularly at least 3 Hz. Merely as an example, the frequency range may be in the range of 2 Hz to 10 Hz.

The suggested frequency range must be distinguished from other frequencies, in particular noise, which has a frequency range of several kilohertz (103 Hz). This frequency range may be disturbing and potentially also lead to fatigue of structures of the nacelle. But the effect of noise on the fatigue is on a very small scale compared to the fatigue avoided by tuning the at least one tuned mass damper to target the proposed frequency range effectively reducing or cancelling displacements of the structure of the nacelle on a large scale.

According to embodiments of the invention, the at least one tuned mass damper is tuned to target at least one mode of motion of the nacelle in a specified frequency range. The mode of motion may be a pattern of oscillation or vibration or other regular repetition of movement. By targeting the at least one mode of motion, the at least one tuned mass damper dissipates energy of that mode of motion, which reduces the displacement amplitude of the support structure, to which the at least one tuned mass damper is attached. The at least one mode of motion or multiple modes of motion may be the only or the main, or in other words predominantly, targeted modes of motion. Accordingly, other modes, such as tower modes, may be affected by the tuned mass damper. However, in any case, these are not the main or predominantly affected modes. The at least one tuned mass damper itself or several tuned mass dampers themselves may contain one or several masses, one or several springs and one or several dampers. The at least one tuned mass damper or the tuned mass dampers are attached to the nacelle support structure in order to reduce the dynamic response of the nacelle support structure. Any type of tuned mass damper such as viscously damped coil spring suspended tuned mass dampers, air suspended tuned mass dampers, viscoelastic tuned mass dampers and pendulum tuned mass dampers may be used as the at least one tuned mass damper. By choice of the design of the tuned mass damper as well as the type, number and parameters of mass, spring, and damper, the tuned mass damper may be tuned or, in other words, designed to target the at least one mode of motion as required.

At least part or all of the motion of the nacelle may be from an up-down motion of the nacelle. This means that at least part or all of the at least one mode of motion of the nacelle in the specified frequency range may be caused by an up-down motion of the nacelle. The up-down motion may alternatively be referred to as a vertical motion. Accordingly, this feature relates to the direction of the motion that the nacelle experiences. In contrast to the side-to-side motion of the tower, the nacelle support structure experiences an up-down motion, i.e., a motion in a direction towards the ground (down) and in a direction opposite to that or away from the ground (up), which is detrimental to the nacelle support structure. Targeting the modes of motion caused by the up-down motion thereby is a very effective way of increasing the lifetime of the nacelle support structure and nacelle components attached thereto.

Additionally, or alternatively, at least part of the motion of the nacelle may be from a twisting motion of the nacelle. This means that at least part or all of the at least one mode of motion of the nacelle or a further mode of motion in the specified frequency range may be caused by the twisting motion of the nacelle. Accordingly, this feature relates to the direction of the motion that the nacelle experiences. The specific nacelle modes caused by a twisting motion are also detrimental to the nacelle support structure and the nacelle components and may thereby be targeted very effectively.

Moreover, at least part of the motion of the nacelle may include a motion of the nacelle support structure. In particular, the motion may be one of a rear-end portion of the nacelle support structure. Accordingly, this feature relates to the specific structure or component of the nacelle, which experiences the motion.

The nacelle support structure may encompass any or all load carrying parts of the nacelle, e.g., a rear frame, side structures, a bedframe and a nacelle base, which are not part of the tower and the rotor blades. That is because any load carrying part of the nacelle that is away from the tower may experience damaging cyclic vibrations. Such load carrying parts may be beams extending from each side of the nacelle on which certain components are installed, for example. For such a configuration, the at least one tuned mass damper would be located on these side beams.

At least part of the motion of the nacelle may include a motion of a housing of the nacelle. The housing may be directly or indirectly structurally attached to the nacelle support structure. Accordingly, the motion of the nacelle support structure may be transferred to the housing and the housing may vibrate together with the nacelle support structure. This motion of the housing, which may be seen from outside of the nacelle, may be damped by the at least one tuned mass damper.

The at least one tuned mass damper may be tuned to target modes of motion of multiple nacelle components separately attached to the nacelle support structure inside the nacelle (and in the frequency range below 50 Hz). Accordingly, one or several tuned mass dampers may be utilized in the nacelle to damp the motions of several separate nacelle components in the specified frequency range. For example, the multiple nacelle components may be two, three, four or more. For example, the nacelle components may in particular be from an electrical component, a cabin, a crane and/or a cooling system. In particular, the afore-mentioned nacelle components may be the ones located closer to the rear-end of the nacelle. Further, these nacelle components may be the ones that are attached to a frame or beam of the nacelle support structure. The components may in particular be attached to a rear-end portion of the nacelle support structure. The addition of the afore-mentioned components makes the rear-end portion longer and thereby more susceptible to being damaged by the cyclic vibrations. Accordingly, the advantageous effects of embodiments of the invention are particularly beneficial for the described setup inside the nacelle.

The at least one motion may in particular be caused by an external load. This is because the life-shortening nacelle support structure cyclic vibrations occur from the external loads rather than the internal loads, which may be caused by the operation of components inside of the nacelle, such as a generator, for example. The external loads may for example be aerodynamic loads, installation loads, transportation loads and seismic loads, when excited near resonance.

In particular, the external load may be caused by a turbulent wind, a shut-down event or a seismic event. These causes for the external loads have been identified as the most critical with respect to the fatigue of the nacelle and its structure. However, the at least one tuned mass damper as proposed herein is effective in reducing or cancelling the fatigue due to such events.

The motion may in particular occur in a rear-end portion of the nacelle support structure. The rear-end portion of the nacelle support structure is disposed behind an attachment point to a tower of the wind turbine in a direction along the nacelle from a rotor of the wind turbine to a rear-end of the nacelle. Accordingly, the rear-end portion hangs freely above the ground and is not directly supported by the tower, i.e., the tower is not directly beneath it. This rear-end portion, which stands out from above the tower, is particular susceptible to the motions from external loads. Accordingly, the advantageous effects of embodiments of the invention are particularly beneficial at this portion of the nacelle support structure.

The at least one tuned mass damper may be attached to a rear-end portion of the nacelle support structure. The rear-end portion of the nacelle support structure may be located at the rear-end of the nacelle. The rear-end portion of the nacelle support structure is the portion inside of the nacelle disposed behind the tower in a direction along the nacelle from the rotor of the wind turbine to the rear-end of the nacelle. On the rear-end portion, which is an outer portion of the nacelle support structure, the displacements of certain modes are the largest. Thus, when the at least one tuned mass damper is attached to the rear-end portion of the nacelle support structure, the at least one tuned mass damper is very effective at damping these modes of motion.

The nacelle may comprise multiple tuned mass dampers attached to the nacelle support structure, in particular its rear-end portion. The tuned mass dampers may be attached to the nacelle support structure at several different locations.

Also, the multiple tuned mass dampers may be tuned to target different modes of motion or motions in the frequency range below 50 Hz. For example, two or more of the multiple tuned mass dampers may be tuned to target at least one mode of a twisting motion and at least another one of the multiple tuned mass dampers may be tuned to target at least one mode from an up-down motion. For this purpose, the two or more of the multiple tuned mass dampers may be located on opposite sides or corners of the nacelle support structure, more particularly its rear-end portion.

The nacelle support structure may comprise a frame or beam. The nacelle components inside of the nacelle may be supported onto the frame or beam. Such nacelle components may be components of the drive train, e.g., bearings, a gearbox and a generator, or other components typically located closer to the rear-end, in particular in the rear-end portion, as described above. The frame or beam may comprise or form the rear-end portion of the nacelle support structure. Further, the nacelle support structure may be attached to a bedframe of the nacelle and/or the nacelle support structure may comprise the bedframe. The frame or beam may be supported onto the bedframe connecting the tower of the wind turbine with the nacelle.

According to a further aspect of embodiments of the invention, the above-mentioned object is solved by a wind turbine comprising the nacelle according to the first aspect of embodiments of the invention and a tower, whereby the nacelle is attached to the tower.

Accordingly, the nacelle may be attached to the tower via a bedframe inside of the nacelle. The nacelle support structure may comprise the bedframe or be attached to the bedframe as previously explained.

The at least one tuned mass damper may be attached to a rear-end portion of the nacelle support structure and the rear-end portion of the nacelle support structure may be disposed behind the tower in a direction along the nacelle from a rotor of the wind turbine to a rear-end of the nacelle. The direction along the nacelle from the rotor to the rear-end of the nacelle is a direction along which the nacelle extends in its length. Accordingly, the rear-end portion is a portion of the nacelle support structure located behind the tower. Thereby, the vibrations of the rear-end portion are targeted by the at least one tuned mass damper attached thereto. The at least one tuned mass damper is thus not or at least not primarily affecting tower modes but rather at least one mode of motion of the nacelle.

According to a further aspect of embodiments of the invention, the above-mentioned object is solved by a use of at least one tuned mass damper in a nacelle for a wind turbine, whereby the at least one tuned mass damper is attached to a nacelle support structure inside of the nacelle and tuned to target at least one motion of the nacelle in a frequency range below 50 Hz.

According to a further aspect of embodiments of the invention, the above-mentioned object is solved by method for dampening at least one motion of a nacelle according to the first aspect of embodiments of the invention, whereby at least one motion of the nacelle in a frequency range below 50 Hz is damped by the at least one tuned mass damper.

The motion may be caused by an external load, which may in particular be caused by a turbulent wind, a shut-down event or a seismic event, as described above. Also, as described above, the at least part or one of the motion of the nacelle may include a motion of the nacelle support structure, the housing and/or multiple nacelle components. Further, at least part or one of the motion may be from a twisting motion and/or an up-down motion of the nacelle, in particular the nacelle support structure, the housing and/or multiple nacelle components.

BRIEF DESCRIPTION

Some of the embodiments will be described in detail, with reference to the following FIGS., wherein like designations denote like members, wherein:

FIG. 1 shows a schematic representation of a wind turbine according to embodiments of the invention.

DETAILED DESCRIPTION

The wind turbine 1 comprises a nacelle 10 attached to a tower 2 by a bedframe 13 of a nacelle support structure 11 located in the interior space 6 of the nacelle 10. The nacelle support structure 11 further comprises a frame or beam attached to the bedframe 13 in this particular embodiment. However, the nacelle support structure 11 may comprise other or further structural parts attached to each other, which do not necessarily have to be a frame or beam. It is to be noted that the illustration in FIG. 1 is schematic and the size, orientation and positioning of the elements such as the nacelle support structure 11 and the bedframe 13 is only chosen for illustration purposes. For example, the nacelle support structure 11 with its frame or beam may be positioned lower and closer to the tower 2 than shown in FIG. 1.

The nacelle support structure 11 supports the drive unit of the wind turbine 1. In this case, the wind turbine 1 is a direct-drive wind turbine 1 and does not have a gearbox. However, the wind turbine 1 may alternatively have any other drive unit such as geared drive unit. The rotor 5 together with the rotor blades 3, 4, which are fixed to the rotor 5, are attached to a drive shaft 16 of that drive unit. In this exemplary embodiment, only two rotor blades 3, 4 are shown. However, the number of rotor blades 3, 4 may be greater, such as three, for example. The drive shaft 16 is connected to a generator 19 and supported on bearings 17, 18, which are supported on the nacelle support structure 11 in the front of the nacelle 10, the front being where the rotor 5 is provided.

The nacelle 10 comprises a housing 8 surrounding the interior space 6 of the nacelle 10 with the components of the nacelle 10 located therein. The nacelle 10 has a rear-end 9, which is located opposite to the rotor 5. The nacelle 10 extends from the rotor 5 or shortly before the rotor 5 at the drive shaft 16 to the rear-end 9. Along this direction, the nacelle 10 has a rear-end section 7. The rear-end section 7 of the nacelle 10 is not rested on the tower 2 but is arranged freely above the ground.

In the rear-end section 7, the nacelle support structure 11 comprises a rear-end portion 12. The rear-end portion 12 extends inside of the rear-end section 7 along the direction from the rotor 5 to the rear-end 9 and up to or before the rear-end 9 of the nacelle 10. The rear-end portion 12 is a portion of the afore-mentioned frame or beam, in exemplary embodiment. However, as previously explained, the rear-end portion 12 may also be a portion of the bedframe 13 or any other suitable structural part of the nacelle support structure 12, by which the nacelle components are supported resting on the tower 2.

The rear-end portion 12 of the nacelle support structure 11 supports a cooling system 15 in this embodiment, which is merely one example of one of multiple nacelle components, which may be separately attached to the nacelle support structure 11 at its rear-end portion 12. Accordingly, there may be more nacelle components such as electrical systems, a cabin and a crane, for example, which may be supported on the nacelle support structure 11 at its rear-end portion 12.

The rear-end portion 12 of the nacelle 10 is particularly susceptible to cyclic vibrations from external loads possibly leading to damages of the nacelle support structure 11. For this purpose, the nacelle 10 comprises a tuned mass damper 20. The tuned mass damper 20 is attached to the rear-end portion 12 of the nacelle 10 and is tuned to target a mode from an up-down motion 14 indicated at the end of the rear-end portion 12, which is in the frequency range below 20 Hz. The tuned mass damper 20 thereby dissipates energy in those specific nacelle modes, which in turn reduce the vibration levels experienced by the nacelle support structure 11 at its rear-end portion 12. The tuned mass damper 20 mainly targets the up-down internal nacelle motion 14 and as such does not damp the vibrations of the tower 2, which are caused by side-to-side motions. Also, the tuned mass damper 20 does not target any noise or other vibrations having a frequency of 20 Hz or higher.

Of course, it is possible to attach further or alternative tuned mass dampers 20 to the nacelle support structure 11 for even further dissipation of energy in extreme events with high fatigue and extreme loads or to target other specific nacelle modes, such as from twisting motions of the nacelle support structure 11, for example.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A nacelle for a wind turbine, comprising:
    a housing surrounding an interior space of the nacelle;
    a nacelle support structure disposed within the interior space of the nacelle, wherein the nacelle support structure has a top side and a bottom side, and supports a drive unit of the wind turbine on the top side;
    at least one tuned mass damper disposed within the interior space of the nacelle, attached to the bottom side of the nacelle support structure, wherein the at least one tuned mass damper is tuned to target at least one mode of motion of the nacelle in a frequency range below 50 Hz, wherein the at least one tuned mass damper is attached to a rear-end portion of the nacelle support structure, the rear-end portion of the nacelle support structure being disposed behind an attachment point to a tower of the wind turbine in a direction along the nacelle from a rotor of the wind turbine to a rear-end of the nacelle, and wherein the rear-end portion hangs freely above the ground and is not directly supported by the tower.

2. The nacelle according to claim 1, wherein at least part of a motion of the nacelle is from an up-down motion of the nacelle.

3. The nacelle according to claim 1, wherein at least part of a motion of the nacelle is from a twisting motion of the nacelle.

4. The nacelle according to claim 1, wherein at least part of a motion of the nacelle includes a motion of the nacelle support structure.

5. The nacelle according to claim 1, wherein at least part of a motion of the nacelle includes a motion of a housing of the nacelle.

6. The nacelle according to claim 1, wherein the at least one tuned mass damper is tuned to target modes of motion of multiple nacelle components separately attached to the nacelle support structure inside the nacelle.

7. The nacelle according to claim 1, wherein the at least one motion is caused by an external load.

8. The nacelle according to claim 7, wherein the external load is caused by a turbulent wind, a shut-down event, or a seismic event.

9. The nacelle according to claim 1, wherein a motion occurs in a rear-end portion of the nacelle support structure, the rear-end portion of the nacelle support structure being disposed behind an attachment point to a tower of the wind turbine in a direction along the nacelle from a rotor of the wind turbine to a rear-end of the nacelle.

10. The nacelle according to claim 1, wherein the nacelle comprises multiple tuned mass dampers attached to the nacelle support structure.

11. The nacelle according to claim 10, wherein the multiple tuned mass dampers are tuned to target different modes of motion of the nacelle in the frequency range below 50 Hz.

12. A wind turbine comprising the nacelle according to claim 1 and a tower, wherein the nacelle is attached to the tower.

13. A method for dampening at least one motion of a nacelle according to claim 1, wherein at least one motion of the nacelle in a frequency range below 50 Hz is damped by the at least one tuned mass damper.

14. A method comprising:
    utilizing at least one tuned mass damper located within a housing of a nacelle for a wind turbine, wherein a nacelle support structure having a top side and a bottom side is located within the housing of the nacelle and supports a drive unit of the wind turbine on the top side, the at least one tuned mass damper being attached to the bottom side of the nacelle support structure also located within the housing of the nacelle and tuned to target at least one motion of the nacelle in a frequency range below 50 Hz;
    wherein the at least one tuned mass damper is attached to a rear-end portion of the nacelle support structure, the rear-end portion of the nacelle support structure being disposed behind an attachment point to a tower of the wind turbine in a direction along the nacelle from a rotor of the wind turbine to a rear-end of the nacelle, and wherein the rear-end portion hangs freely above the ground and is not directly supported by the tower.

* * * * *